Dec. 27, 1927.
O. E. HOFFMANN
1,654,124
OIL RETURNING DEVICE FOR AXLE BEARINGS
Filed Dec. 24, 1925
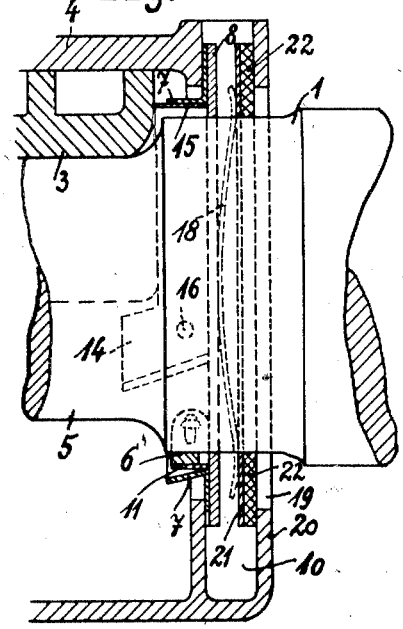
Fig.1.
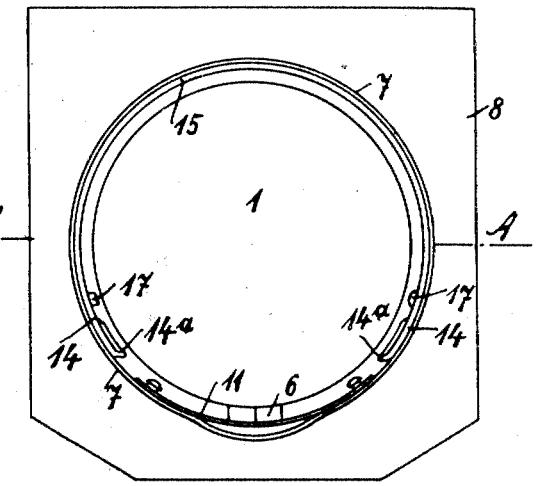
Fig.2.
Fig.3.
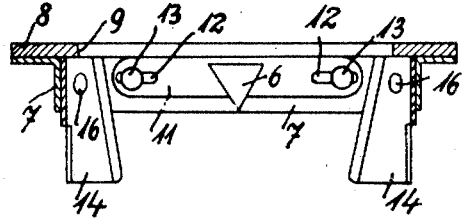
Fig.4.
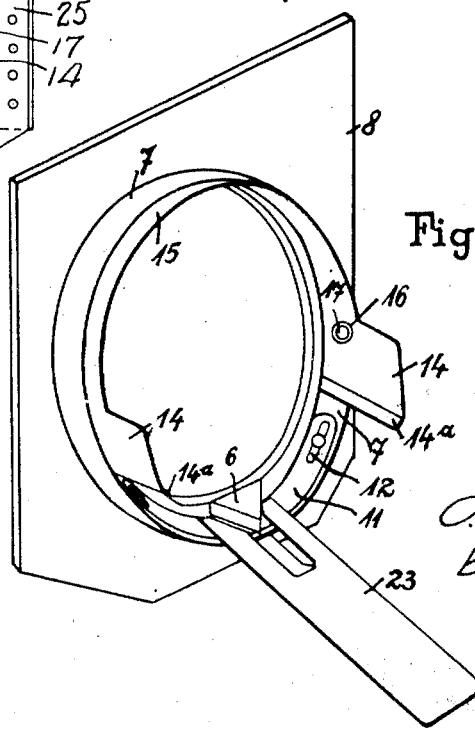
Fig.6.
Fig.5.
Inventor
O. E. Hoffmann
by
Langner, Parry,
Card & Langner
Atty's.

Patented Dec. 27, 1927.

1,654,124

UNITED STATES PATENT OFFICE.

OTTO ERNST HOFFMANN, OF HAMBURG, GERMANY.

OIL-RETURNING DEVICE FOR AXLE BEARINGS.

Application filed December 24, 1925, Serial No. 77,608, and in Germany January 9, 1925.

This invention refers to an oil-returning device for axle bearings, in which a pad or wiper yieldingly pressed against the axle journal and supported by a ring is sustained by a plate embracing the axle journal and situated in the dust chamber. The novelty resides in the feature that the said ring is rigidly connected with the said plate, and that between the pad and the ring is interposed a spring, which presses only the pad against the journal. Owing to its small weight and therefore its slight inertia developed due to the shock when the wheel on the axle runs over a rail joint, the pad is not liable to be subjected to hammering vibrations, that might damage the shoulder or collar of the journal. The plate may embrace the collar of the journal closely, serving as a dust retaining means additional to the dust ring. The pad is preferably mounted on a blade spring, the ends of which are held slidably to the inner face of the carrier ring so that the spring has freedom to distend fully or approximately so, the distance of the ring from the axle journal, the length of the spring and the height of the pad being such that when the pad bears against the journal the spring is sufficiently stressed to exercise a pressure against the journal. Thus the spring is so limited in its movements that there is no resilience when the pad is fully worn away, so that there can be no friction of steel against steel.

In the accompanying drawing is illustrated by way of example one embodiment of the invention.

Fig. 1 is a vertical section of a part of an axle bearing equipped with the oil-returning device.

Fig. 2 is an end view of the device separated from the axle bearing.

Fig. 3 is a detail showing the pad and its spring.

Fig. 4 is a horizontal section on the line A—A of Fig. 2, and

Fig. 5 is a perspective view of the device.

Fig. 6 is a view in elevation showing a modified form of the invention.

The object of the invention is to yieldingly press a pad 6 having preferably a triangular or trapeziform shape against the shoulder or collar 1 of the axle journal 5 journalled in the bush or step 3 of the bearing 4. The member 6 is supported by a carrier ring 7, attached to a plate 8 arranged in the dust chamber. The plate is composed of soft metal as brass or of vulcanite, faturan, (a composition of matter including resin and fibrous material), or other packing material resistant to wear and has an aperture 9 to embrace closely the shoulder 1. The outline of the plate is substantially square or such that it fairly fits the inside of the dust chamber 10 and is prevented from rotating therein. The plate 8 is thus floatingly supported by the journal and follows its movements, carrying with it the ring 7. The pad 6 is held to the ring 7 by the blade spring 11, the ends of which are slidable in longitudinal direction, for instance being formed with slots 12, into which project headed pins 13 mounted in the ring 7. As will be seen from Fig. 2 the distance between the ring 7 and the shoulder 1, the length of the spring 11 and the height of the pad 6 are so dimensioned that when the pad 6 bears on the shoulder the spring is not distended but has sufficient curvature to exercise pressure against the axle.

Detachably connected with the upper part of the ring 7 is an enlargement 15 extending up to the bush 3 and having lugs 14 which engage the bush on the underside. The enlargement 15 consists of a resilient piece of sheet metal having apertures 16 engaged by studs 17 mounted inside the ring 7. On compression of the sheet metal member 15 the studs 17 can be disengaged from the apertures 16 and the enlargement removed. The enlargement 15, 14 serves to intercept the current of oil within the bearing and to promote the return flow. The edges 14ª of the lugs 14 are preferably bent inwardly.

The plate 8 is pressed against the partition wall between the dust chamber 10 and the oil chamber of the bearing 4 by blade springs 18. The free ends of these springs abut against a packing plate closing the opening 19 in the opposite wall 20 of the dust chamber 10, which packing plate preferably consists of a sheet 21 of brass, vulcanite, faturan, or the like and closely fitting around the shoulder 1 having a packing 22 of felt or the like.

To facilitate the mounting of the device in the bearing there is a bifurcated implement 23 (Fig. 5) by means of which the spring 11 may be held against the inner face of the carrier ring 7, thereby permitting introduction of the axle journal.

The plate 8 may be formed in sections 24 and 25 as shown in Fig. 6 so as to be free to yield when upon introduction of the bush 3 into the bearing 4 the latter is held at an angle to the axle journal. The sections will be held together in working position close to the shoulder 1 by one or more springs 26. In this form of invention the ring or enlargement 15 is carried by the lower part of the plate 8, while the upper part of the plate 8 is spring-pressed.

I claim:

1. An oil returning device for axle bearings of the type having a dust chamber and a journal chamber comprising a pad adapted to be elastically pressed against the axle journal, a ring supporting said pad, a plate adapted to embrace the axle journal within the dust chamber and connected with and holding said ring, a spring on which said pad is mounted and which is arranged between said pad and the ring and adapted to press it against the journal.

2. A device according to claim 1 characterized in that the pad is mounted on a blade spring the ends of which are held slidably on the inside of the ring so that the spring can be distended or approximately distended the distance of the ring from the axle journal, the length of the spring and the height of the pad being such that, when the pad bears on the journal, the spring is still sufficiently stressed to exercise pressure against the journal.

3. A device according to claim 1 characterized in that the pad is mounted on a blade spring the ends of which are slotted and held slidably on the inside of the ring by studs, the slots being of such length that the spring can be distended or approximately distended the distance of the ring from the axle journal, the length of the spring and the height of the pad being such that, when the pad bears on the journal the spring is still sufficiently stressed to exercise pressure against the journal.

4. A device according to claim 1, for axial bearings including a bush or step characterized in that the upper part of the ring is connected with an enlargement provided with lugs and adapted to catch under the bush or step.

5. A device according to claim 1, for axial bearings including a bush characterized in that the upper part of the carrier ring is connected with an enlargement consisting of a spring piece of sheet metal having apertures engaged by studs mounted on the inside of the said carrier ring, and provided with lugs and adapted to catch under the bush.

6. A device according to claim 1, for axial bearings including a bush characterized in that the upper part of the ring is connected with an enlargement provided with lugs and adapted to catch under the bush the lower rim of each lug being bent inwardly.

7. A device according to claim 1, characterized in that the plate is made in sections held together by springs and forms a partition to separate said dust chamber from said journal chamber.

In testimony whereof I have signed my name to this specification.

OTTO ERNST HOFFMANN.